Jan. 29, 1929.
H. K. HYRUP
PIPE THREAD CLEANER AND CHASER
Filed Sept. 25, 1924
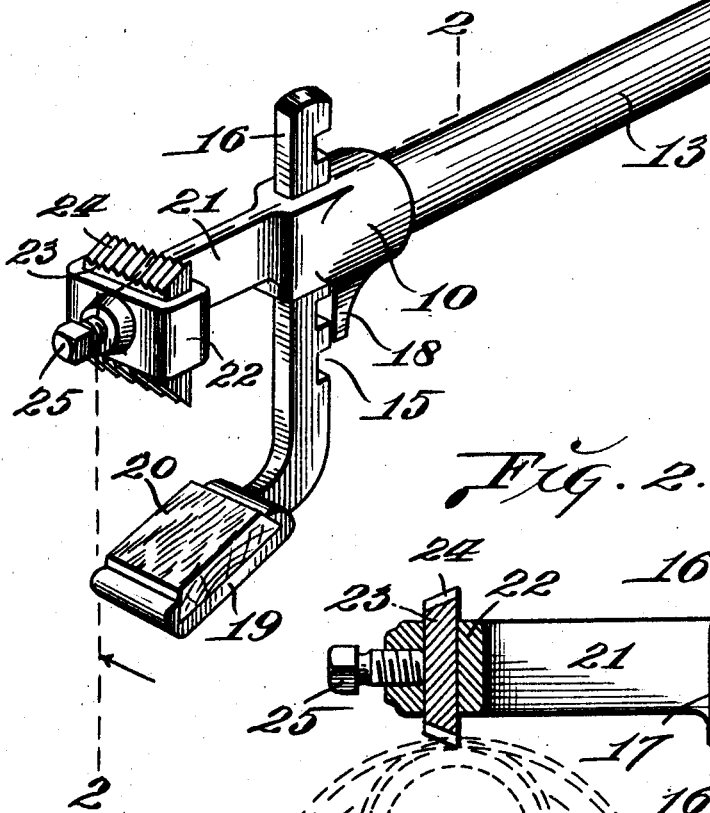
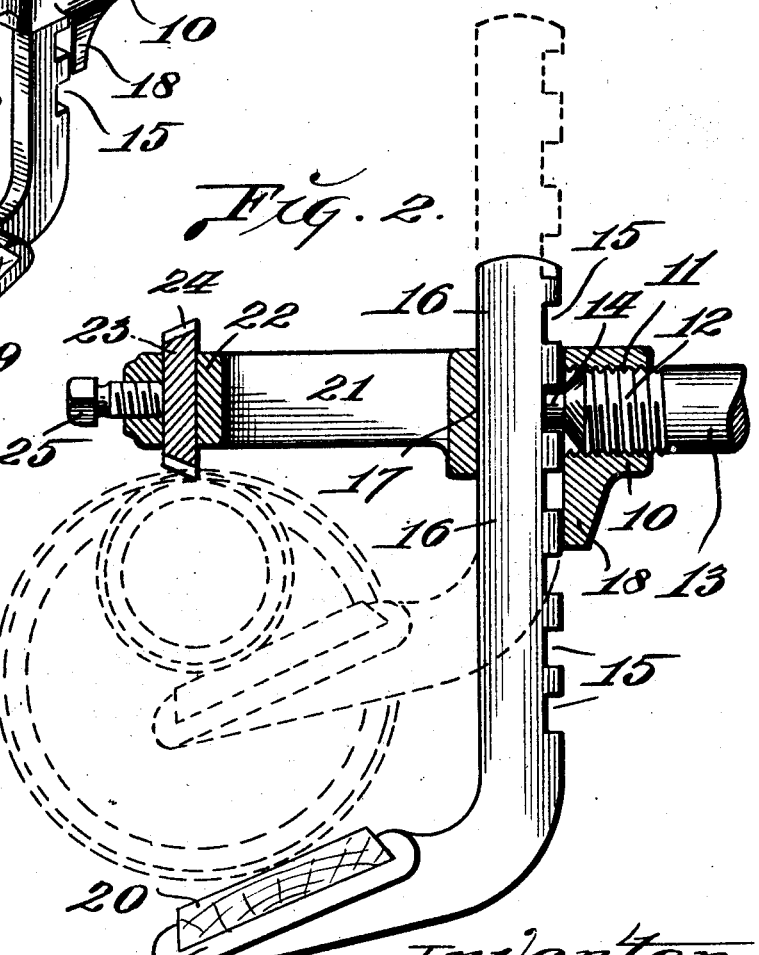
Inventor,
Hans K. Hyrup.
By Martin P. Smith, Atty Patented Jan. 29, 1929.

1,700,409

UNITED STATES PATENT OFFICE.

HANS K. HYRUP, OF LOS ANGELES, CALIFORNIA.

PIPE-THREAD CLEANER AND CHASER.

Application filed September 25, 1924. Serial No. 739,821.

My invention relates to a pipe thread cleaner and chaser, the principal objects of my invention being to provide a relatively simple, practical and efficient device that may be conveniently used for cleaning and chasing threaded portions of pipes and the like; further, to provide a tool of the character referred to that may be readily adjusted so as to be used on pipes of different diameters; and, further, to provide a pipe thread cleaner and chaser that is adapted to interchangeably receive chasers or bits having teeth that correspond with the threads per inch on the pipes that are engaged by the tool.

It will be understood that wherever a large number of pipes are used, for instance, in and around oil fields, the threaded portions of some of the pipes become partially battered down and filled with rust, hardened oil, dirt and the like, and as a result it is a comparatively difficult matter to screw the coupling nippers on to these partially battered or dirt filled threads. With my improved tool, the threaded portions of pipes may be very readily cleaned and chased, thereby permitting the couplings or nipples to be easily and quickly applied to said pipes.

With the foregoing and other objects in view, my invention consists in the features of construction and combination and arrangement of parts hereinafter more fully described and claimed, reference being had to the accompanying drawings, wherein:

Figure 1 is a perspective view of a pipe thread cleaner and chaser of my improved construction;

Figure 2 is an enlarged vertical section taken approximately on the line 2—2 of Figure 1.

Referring by numerals to the accompanying drawings, which illustrate a practical embodiment of my invention, 10 designates a socket block having a threaded aperture 11 that is adapted to receive the threaded portion 12 of a handle 13, which latter may be of any desired and convenient length. The end of the handle that enters the socket block is reduced in diameter and provided with a short axially disposed lug 14 that is adapted to enter any one of a series of notches 15 that are formed in the rear edge of a bar 16. This bar occupies a vertically disposed slot 17 that is formed through the socket block directly in front of the threaded aperture 11, and depending from block 10 immediately to the rear of slot 17 is a lug 18 that serves as a bearing for that portion of the bar 16 that is disposed immediately below the socket block.

The lower portion of bar 16 is bent forwardly so that it occupies an angular position of approximately ten or fifteen degrees relative to a horizontal plane, and formed on the outer portion of this inclined lower end of said bar is a plate 19 in which is removably seated a block 20 of wood, fiber or analogous material that serves as a support for the pipe while the threads thereof are being cleaned and chased.

Formed integral with and projecting forwardly from the socket block 10 is an arm 21 and formed integral with the outer end thereof is a transversely disposed loop 22 that is adapted to receive a thread chaser 23. This chaser is preferably formed of hardened metal, and its upper and lower end are inclined or beveled and provided with V-shaped ribs or corrugations 24 that correspond with standard pipe threads. Thus, one chaser may be provided on one end with ribs or teeth that correspond with ten threads per inch on a pipe, while the opposite end of said chaser may be provided with teeth corresponding to eleven or twelve pipe threads per inch. Obviously a number of the chasers may be provided for each tool and said chasers interchangeably used. The chaser is locked in operative position within the loop 22 by means of a set screw 25 that is seated in the outer portion of said loop and which set screw when tightened bears directly against the outer face of the chaser and securely locks the latter in position within the tool.

In the use of my improved pipe thread cleaner and chaser, the handle 13 is unscrewed a sufficient distance to disengage lug 14 from the notched edge of bar 16, and the latter is then adjusted through the socket block until the block 20 engages the under side of a pipe that is positioned so that the lower set of teeth on the chaser 23 engage in the pipe threads. Handle 13 is now screwed into the socket block so that lug 14 engages any one of the notches 15, and the tool is now manually engaged and rotated about the threaded end of the pipe so that the ribs or teeth on the lower end of chaser 23 pass between threads of the pipe, thereby effectively cleaning the latter and straightening those portions that may have been crushed or battered down. During this cleaning and chasing operation, the threaded portion of the pipe bears on the block 20 of wood or fiber, and when the latter becomes worn so as to be unfit for service it is removed and a new block positioned on plate 19.

A pipe thread cleaning and chasing tool of my improved construction is comparatively simple, may be easily and cheaply produced, is capable of being readily adjusted so as to be used on pipes of different diameters, and said tool is very effective in performing its intended functions.

It will be understood that various minor changes may be made in the form, size and construction of my improved pipe thread cleaning and chasing tool without departing from the spirit of my invention, the scope of which is set forth in the appended claim.

I claim as my invention:

In a pipe thread cleaner and chaser, the combination with a block provided with a pair of openings arranged at right angles to each other, one of which openings is threaded, an L-shaped member having one of its legs arranged for sliding movement in the other opening, the leg of said L-shape member that passes through the opening in the block being provided with a series of notches a lug depending from the block to provide a bearing for the notched rear side of the leg of the L-shaped member that passes through said block, a handle screw seated in the threaded opening in the block, a stud on the inner end of said handle, which stud is adapted to enter any one of the notches in the leg of said L-shape member, an arm projecting forwardly from said block, there being an opening formed through the outer end of said arm, which opening lies substantially parallel with the opening in the block that receives the notched leg of the L-shaped member, a reversible chasing bit removably positioned in the opening in the outer end of said arm and a set screw seated in the outer end of said arm for locking the chasing bit to said arm.

In testimony whereof I affix my signature.

HANS K. HYRUP.